United States Patent
Brown (10) Patent No.: US 9,490,974 B2
(45) Date of Patent: Nov. 8, 2016

(54) IDENTITY-BASED DECRYPTION

(75) Inventor: Daniel R. L. Brown, Mississauga (CA)

(73) Assignee: Certicom Corp., Mississauga, Ontario (CA)

(*) Notice: Subject to any disclaimer, the term of this patent is extended or adjusted under 35 U.S.C. 154(b) by 95 days.

(21) Appl. No.: 13/433,747

(22) Filed: Mar. 29, 2012

(65) Prior Publication Data

US 2012/0254616 A1   Oct. 4, 2012

(30) Foreign Application Priority Data

Apr. 1, 2011   (WO) ................ PCT/CA2011/050181

(51) Int. Cl.
| | | |
|---|---|---|
| *H04L 9/32* | (2006.01) | |
| *H04L 9/08* | (2006.01) | |
| *H04L 29/06* | (2006.01) | |
| *H04L 9/30* | (2006.01) | |

(52) U.S. Cl.
CPC .......... *H04L 9/0825* (2013.01); *H04L 63/061* (2013.01); *H04L 63/0823* (2013.01); *H04L 9/3073* (2013.01); *H04L 2209/76* (2013.01); *H04L 2463/062* (2013.01)

(58) Field of Classification Search
CPC ............ H04L 9/3073; H04L 63/0428; H04L 63/0442; H04L 63/08; H04L 63/062; H04L 9/08; H04L 9/083; H04L 63/04; H04L 9/0825; H04L 63/061; H04L 63/0823; H04L 2209/76; H04L 2463/062
USPC ................................................ 713/168–171
See application file for complete search history.

(56) References Cited

U.S. PATENT DOCUMENTS

| | | | | |
|---|---|---|---|---|
| 5,481,613 A | * | 1/1996 | Ford et al. .................... | 380/30 |
| 6,088,456 A | * | 7/2000 | McCracken .......... | H04L 9/0656 |
| | | | | 380/259 |
| 6,275,936 B1 | * | 8/2001 | Kyojima et al. ............. | 713/182 |
| 6,567,914 B1 | * | 5/2003 | Just .......................... | H04L 9/14 |
| | | | | 380/278 |
| 7,188,085 B2 | * | 3/2007 | Pelletier ......................... | 705/50 |

(Continued)

OTHER PUBLICATIONS

H. Khurana et al., On the Risks of IBE, in the International Workshop on Applied PKC (IWAP), Dalian, China, Nov. 2006, http://netfiles.uiuc.edu/hkhurana/www/IWAP06.pdf.

*Primary Examiner* — Catherine Thiaw
(74) *Attorney, Agent, or Firm* — Jon Gibbons; Fleit Gibbons Gutman Bongini & Bianco P.L.

(57) ABSTRACT

Devices and methods are provided for managing identity-based decryption of digital content. A message sender ("Alice") uses a random key (Krand) to encrypt message content for a message recipient ("Bob"). Then Alice uses the public key of a message decryption service provider ("Carmen") to generate a wrapped key ciphertext comprising the Krand and authentication information associated with Bob. Alice then sends a message text containing the encrypted message content and the wrapped key ciphertext to Bob, who in turn sends the wrapped key ciphertext to Carmen along with his authentication information. Carmen then uses her private key to process the wrapped key ciphertext to decrypt the Krand and Bob's authentication information. If the authentication information provided by Bob matches the decrypted authentication information, then Carmen sends the decrypted Krand to Bob, who uses it to decrypt the encrypted message content.

32 Claims, 4 Drawing Sheets

(56) References Cited

U.S. PATENT DOCUMENTS

| | | | |
|---|---|---|---|
| 7,333,616 B1* | 2/2008 | Brettle et al. | 380/277 |
| 7,657,037 B2* | 2/2010 | Callas | 380/284 |
| 8,073,787 B2* | 12/2011 | Fitzsimmons | G06Q 10/107 705/1.1 |
| 8,145,718 B1* | 3/2012 | Kacker | H04L 9/0847 709/206 |
| 8,171,523 B2* | 5/2012 | Weksler | H04L 12/58 713/189 |
| 8,483,393 B2* | 7/2013 | Robert | 380/278 |
| 2003/0147536 A1* | 8/2003 | Andivahis | H04L 63/06 380/277 |
| 2004/0179684 A1* | 9/2004 | Appenzeller | H04L 9/0825 380/44 |
| 2005/0010801 A1* | 1/2005 | Spies | H04L 9/3073 726/5 |
| 2005/0071632 A1* | 3/2005 | Pauker | H04L 63/0442 713/165 |
| 2005/0135610 A1* | 6/2005 | Chen | H04L 9/3073 380/30 |
| 2006/0095770 A1* | 5/2006 | Baylis et al. | 713/171 |
| 2007/0083759 A1* | 4/2007 | Drew et al. | 713/168 |
| 2008/0263357 A1* | 10/2008 | Boyen | 713/168 |
| 2009/0034714 A9* | 2/2009 | Boneh et al. | 380/28 |
| 2009/0307497 A1* | 12/2009 | Appenzeller et al. | 713/171 |
| 2009/0327731 A1* | 12/2009 | Appenzeller et al. | 713/171 |
| 2010/0017593 A1* | 1/2010 | Putz | 713/150 |
| 2010/0031042 A1* | 2/2010 | Di Crescenzo et al. | 713/169 |
| 2010/0208895 A1* | 8/2010 | Boneh et al. | 380/278 |
| 2010/0293099 A1* | 11/2010 | Pauker et al. | 705/67 |
| 2011/0167264 A1* | 7/2011 | Takahashi et al. | 713/168 |
| 2011/0235799 A1* | 9/2011 | Sovio | H04L 9/083 380/30 |
| 2012/0144198 A1* | 6/2012 | Har | H04W 12/06 713/170 |

* cited by examiner

IDENTITY-BASED DECRYPTION

BACKGROUND OF THE INVENTION

1. Field of the Invention

The present invention is directed in general to communications systems and methods for operating same. In one aspect, the present invention relates to devices and methods for managing identity-based decryption of digital content.

2. Description of the Related Art

The use of cryptography to protect digital assets and to authenticate a person's online identity has become increasingly popular in recent years. One such approach is public key cryptography, which is based on the concept of asymmetric key pairs. In this approach, a public key and a private key are generated for each user. The public key of a recipient is then used by a sender to encrypt a message, which is then sent to a recipient. In turn, the recipient uses their private key to decrypt the message.

One issue with public key cryptography is verifying, or authenticating, the identities of two parties. One approach to this issue is the creation of a public key infrastructure (PKI), which uses a certificate authority (CA) to bind a public key to the identity of a user. The binding is typically accomplished by using the CA's private key, and a user's public key, to generate a digital certificate that certifies authenticity of the user. In turn, the digital certificate is used by a web browser to authenticate one user (e.g., a sender) to another user (e.g., a recipient).

However, the practical use of public key cryptography for authentication presumes that both parties to a transaction already possess their respective unique key pairs, or alternatively, have access to the means to have them generated when they are needed. Furthermore, users likewise need ubiquitous access to a PKI for authenticating themselves to one another. Yet this is not always the case. As a result, alternative approaches to authentication have been implemented, including identity-based encryption, which allows a user to use their name, network address, or other unique, yet easily provided identifying information, as their public key. The user's corresponding private key is generated by a key generation center and provided to the user in the form of a smart card or token. However, this approach still requires the generation and distribution of the private key to the user, which can be expensive, time consuming, and error-prone. Another approach to authentication is the traditional use of user names, passwords, and other factors to verify the identity of a user. However, these approaches typically do not encrypt content prior to its delivery.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Devices and methods are provided for managing identity-based decryption of digital content. In various embodiments, a message sender ("Alice") populates an identity-based encryption applet with message content and authentication information associated with a message recipient ("Bob"). In one embodiment, the message content comprises plain text. In another embodiment, the message content comprises binary code. In yet another embodiment, the message content comprises a combination of plain text and binary code.

The identity-based encryption applet then generates a random key (Krand), which it then uses to process the message content to generate encrypted message content. The identity-based encryption applet then processes a public key associated with a message decryption service provider ("Carmen"), the Krand, and Bob's authentication information to generate a wrapped key ciphertext. A message text containing the encrypted message content, the wrapped key ciphertext, instructions for Bob, and formatting is then generated by the identity-based decryption applet.

The message text is then sent to Bob in an email message, who then copies the message text from the email into an identity-based decryption applet which then sends the wrapped key ciphertext to Carmen. In turn, Carmen uses her private key to process the wrapped key ciphertext to decrypt the Krand and Bob's authentication information. Bob then provides authentication information. If the authentication information provided by Bob matches the decrypted authentication information, then Carmen sends the decrypted Krand over a secure channel to Bob's identity-based decryption applet. The Krand is then used by the identity-based decryption applet process the content ciphertext to decrypt the message content.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Figure 1:
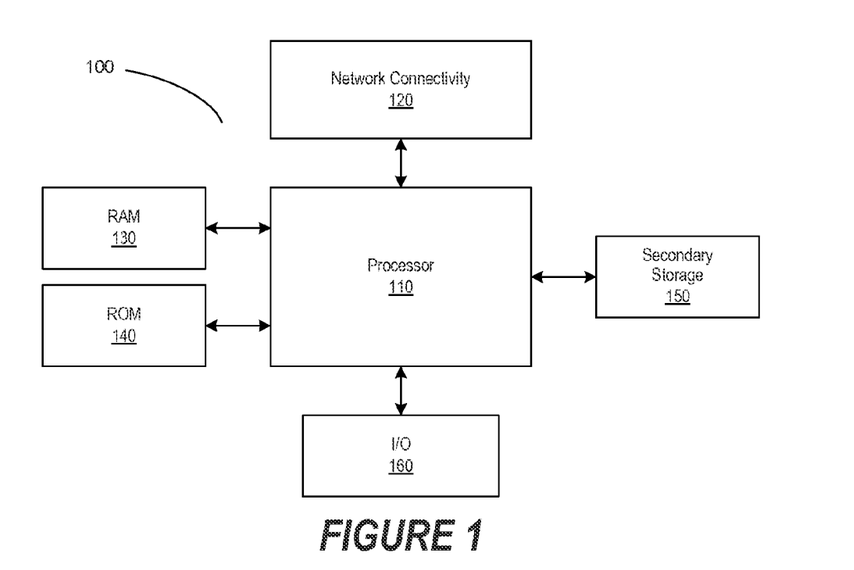
FIG. 1 depicts an exemplary system in which the present invention may be implemented.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper, tape readers, printers, video monitors, or other wet known input/output devices.

Figure 2:
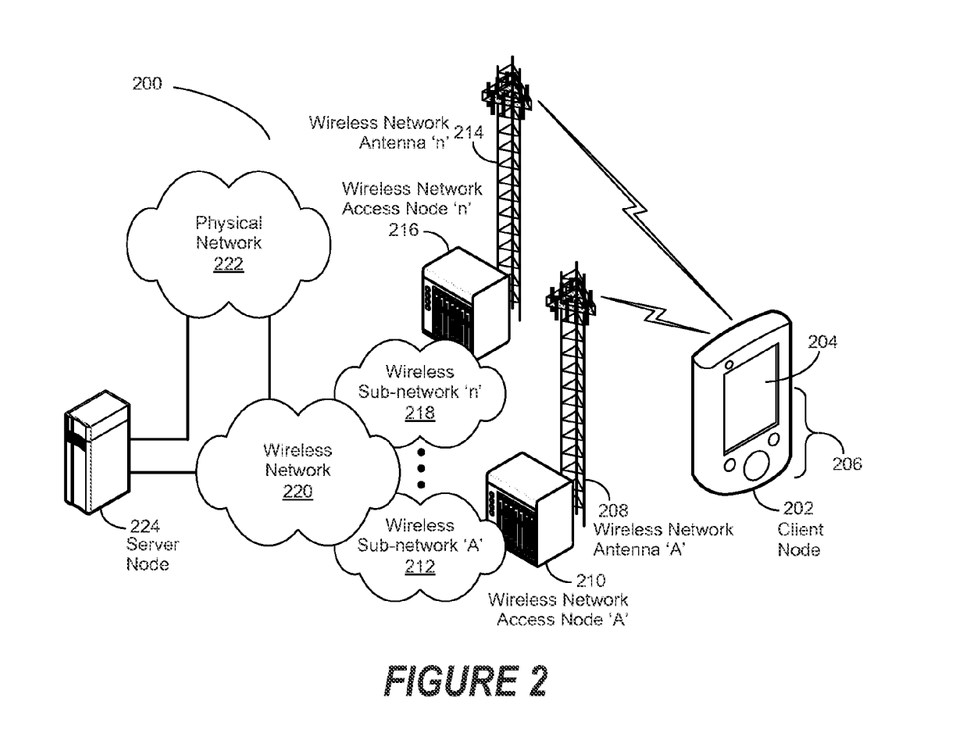
FIG. 2 shows a wireless-enabled communications environment including an embodiment of a client node.

FIG. 2 shows a wireless-enabled communications environment including an embodiment of a client node as implemented in au embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
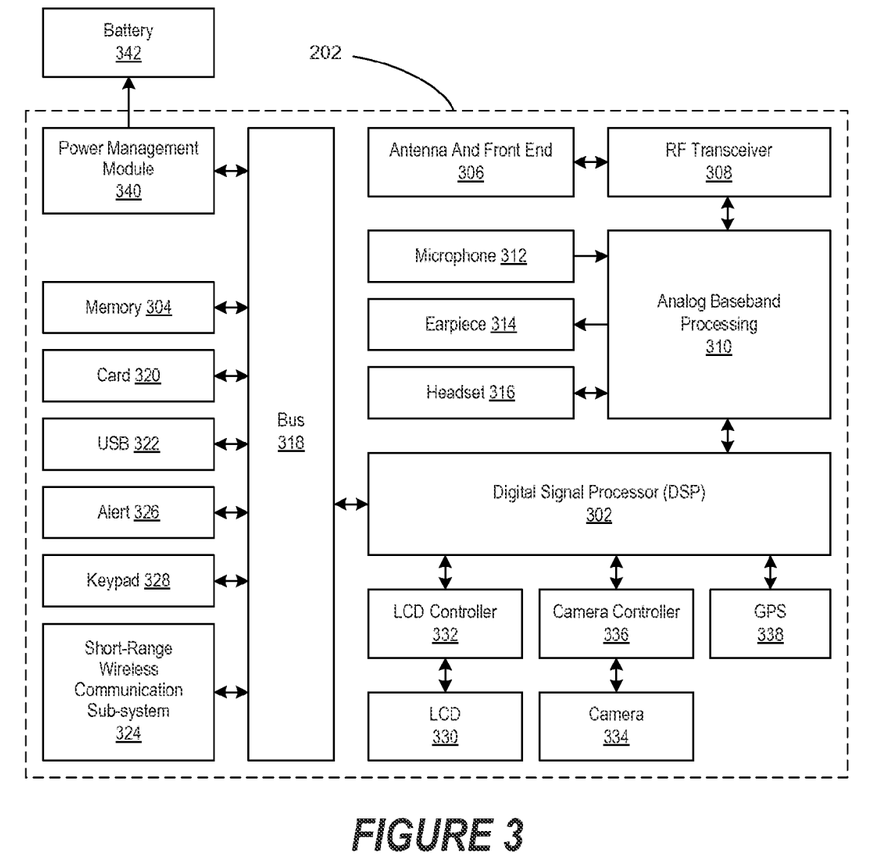
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202, may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 tray have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
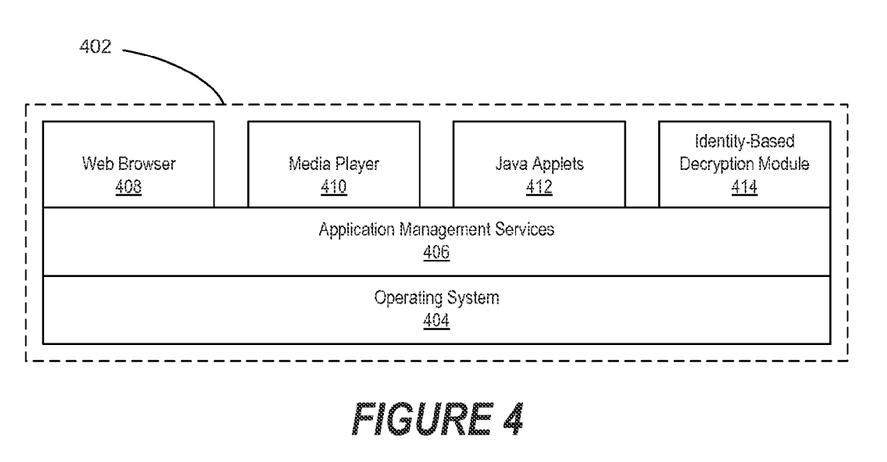
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, Java applets 412, an identity-based encryption module 414, and an identity-based decryption module 416. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. In various embodiments, an identity-based encryption module 414 and the identity-based decryption module 416 are implemented to provide functionalities described in greater detail herein. In one embodiment, the identity-based encryption module 414, and the identity-based decryption module 416 are implemented as java applets, such as java applets 412. In various embodiments, the client node 202, the wireless network nodes 'A' 210 through 'n' 216, and the server node 224 shown in FIG. 2 may likewise include a processing component that is capable of executing instructions related to the actions described above.

Figure 5:
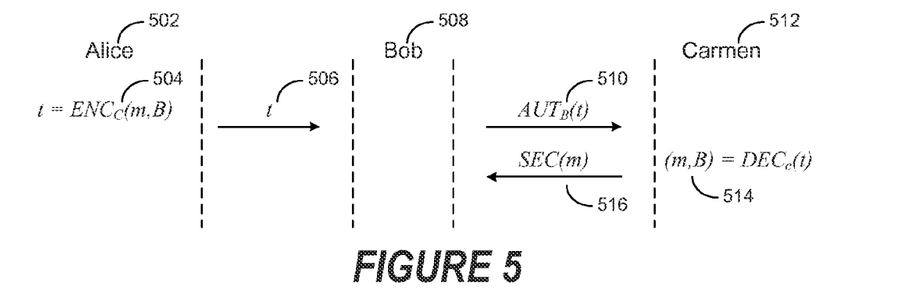
FIG. 5 is a simplified illustration of a set of message flows for managing identity-based decryption of digital content.

FIG. 5 is a simplified illustration of a set of message flows as implemented in accordance with an embodiment of the invention for managing identity-based decryption of digital content. In this embodiment, a message sender ("Alice") 502 first creates message content ('m') to be sent to a message recipient ("Bob") 508. Alice 502 then uses the public key ('C') of an identity-based decryption service provider ("Carmen")' 512 to encrypt (ENC) the message content 'm' and authentication information ('B') associated with Bob 508 with, where $t=ENC_C(m,B)$.

In one embodiment, Alice appends a header to the message indicating that it is intended for Bob. In another embodiment, Alice may include other information in the header. This information may include her own identity, the identity of an identity-based decryption service provider ("Carmen")' 512, a validity period, or any other information useful for security purposes, especially for the purpose of authenticating Bob. In these and other embodiments, the other information is encrypted using Carmen's 512 public key as described in greater detail herein.

Alice then sends the message text ('t') 506 to Bob 508, along with unencrypted instructions directing Bob 508 to ask Carmen 512 to decrypt it. In to Bob 508 forwards 510 it, along with his authentication information ('$AUT_B$') to Carmen 512, who then uses her private key ('c') to process 514 the message text 't' to decrypt ('DEC') the message content 'm' and Bob's authentication information 'B', where $(m,B)=DEC_c(t)$. If the authentication information '$AUT_B$' provided by Bob 508 matches the authentication information 'B' associated with Bob 508 in the decrypted message text, then Carmen 512 sends the decrypted message content 'in' to Bob 508 over a secure channel ('SEC'), where SEC(m) refer to secured messages communicated over the SEC. In one embodiment the $AUT_B$ provided by Bob 508 comprises authentication data provided by a third party. In another embodiment, the $AUT_B$ provided by Bob 508 comprises authenticating biometric data.

In another embodiment, described in greater detail herein, Alice 502 the message text 't' 506 to Carmen, and likewise sends a message to Bob 508 notifying him that an encrypted message awaits him and it will be decrypted by Carmen 512 once Bob 508 authenticates himself. Bob 508 then proves his identity to Carmen 512, who then decrypts the message text 't' using her private key. Once the message content 'm' is decrypted, it is provided to Bob 508 by Carmen 512 over a secure channel.

Figure 6:
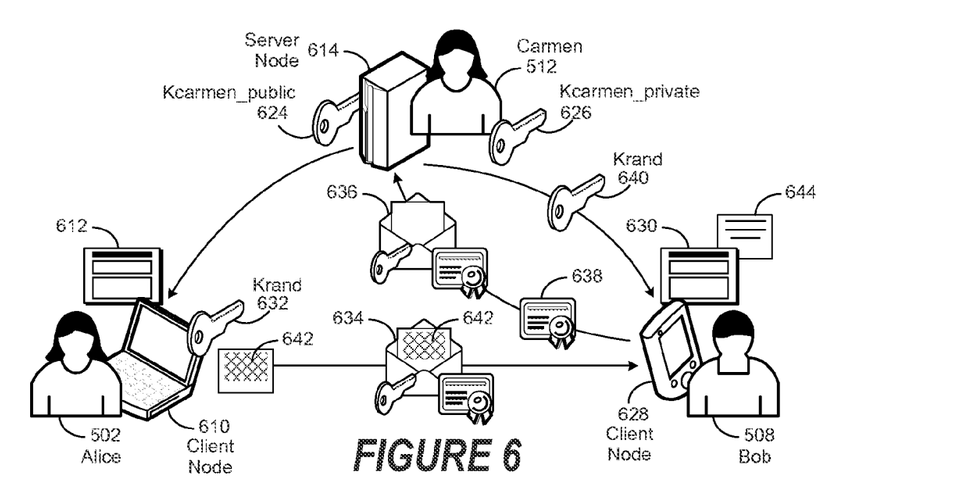
FIG. 6 is a simplified block diagram of an exemplary process flow for managing identity-based decryption of digital content.

FIG. 6 is a simplified block diagram of an exemplary process flow as implemented in accordance with an embodiment of the invention to manage identity-based decryption of digital content. In this embodiment, a message sender ("Alice") 502 uses a client node 610 to access a server node 614 operated by a message decryption service provider ("Carmen") 512. Alice 502 then downloads an identity-based encryption applet 612 from Carmen's 512 server node 614, and initiates it within a web browser executing in her client node 610. Alice then populates the identity-based encryption applet 612 with message content and authentication information associated with a message recipient ("Bob") 508. In one embodiment, the message content comprises plain text. In another embodiment, the message content comprises binary code. In yet another embodiment, the message content comprises a combination of plain text and binary code.

The identity-based encryption applet 612 executing in Alice's 502 web browser then generates a random key (Krand) 632, which it then uses to process the message content to generate encrypted message content 642. The identity-based encryption applet 612 then processes Carmen's public key 624, the Krand 632, and Bob's 508 authentication information to generate a wrapped key ciphertext. A message 634 containing the encrypted message content 642, the wrapped key ciphertext, instructions for Bob 508, and associated message formatting, is then generated by the identity-based encryption applet 612. In one embodiment, Bob's 508 authentication information is incorporated into the encryption parameters. As an example, some encryption schemes, such as Elliptic Curve Integrated Encryption Scheme (ECIES), include a key derivation function that admits as an argument some arbitrary input fields.

The message 634 is then sent to Bob 508 as an email message over an unsecured channel. Bob 508 receives the email message, and in turn, accesses Carmen's 512 server 614 to download and initiate an identity-based decryption applet 630 within a web browser executing in his client node 628. Bob 508 then copies the received message 634 into the identity-based decryption applet 630, but retains the encrypted message content 642. In turn, the identity-based decryption applet 630 sends the wrapped key ciphertext 636, without the encrypted message content 642, to Carmen's 512 server node 614. Carmen's 512 server node 614 then uses Carmen's private key 626 to process the wrapped key ciphertext 636 to decrypt the Krand 640 and Bob's authentication information.

Carmen's 512 server node 614 then requests authentication information 638 from Bob 508, which he provides. In one embodiment, the authentication information 638 was provided by Alice 502 to Bob 508 in a verbal communication. In another embodiment, the authentication information 638 was provided by Alice 502 to Bob 508 in a separate email or text message (e.g., a short message service over a mobile device). In yet another embodiment, the authentication information 638 comprises one or more authentication factors familiar to those of skill in the art. As an example, Bob 508 may provide a user ID and password, a biometric identifier, or a cryptographic token. Skilled practitioners of the art will recognize that many such embodiments are possible and the foregoing is not intended to limit the spirit, scope or intent of the invention.

If the authentication information 638 provided by Bob 508 matches the decrypted authentication information, then Carmen's 512 server node 614 sends the decrypted Krand 640 over a secure channel to the identity-based decryption applet 630 running in Bob's web browser. Skilled practitioners of the will realize that the Krand 632 and the Krand 640 are in fact the same random key. However, as illustrated in FIG. 6, the Krand 632 represents the random key at the time it is generated by Alice 502, and then subsequently encrypted in the wrapped key ciphertext 636, and the Krand 640 represents the same random key after it has been decrypted by Carmen. It will likewise be appreciated that the process Carmen 512 uses to authenticate the identity of Bob 508 should be similar in strength of security to the process that a typical certificate authority (CA) uses to authenticate the identity of Bob 508 when issuing a digital certificate. This process should likewise be similar in strength of security to the process that a trusted authority in an identity-based encryption scheme authenticates the identity of a party to whom it will generate a private key for its identity. The decrypted Krand 640 is then used by the identity-based decryption applet 630 to process the content ciphertext to decrypt the encrypted message content 642 that was previously retained by Bob 508. The decrypted message content 644 is then displayed within the web browser running on Bob's 508 client node 628.

In one embodiment, Alice 502 maintains the Krand 632 and Bob 508 maintains the Krand 640 decrypted by Carmen 512 for long-term encryption of multiple ciphertexts, in both directions. Further, using known methods, they can update the shared secret key (Krands 632, 640) periodically, of even routinely (e.g., with every ciphertext), further mitigating the threat that Carmen 512 might betray her trusted role and attempt to decrypt Alice's 502 and Bob's 508 ciphertext. Likewise, routine rekeying would require Carmen 512 to intercept and decrypt every ciphertext communicated between Alice 502 and Bob 508 in order to be able to decrypt future ciphertexts between each other.

Figure 7:
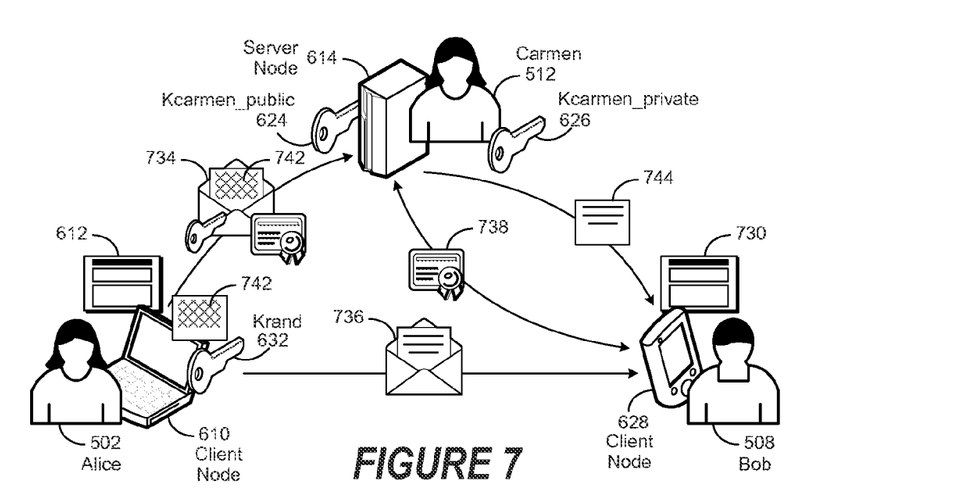
FIG. 7 is a simplified block diagram of an alternative process flow for managing identity-based decryption of digital content.

FIG. 7 is a simplified block diagram of an alternative process flow as implemented in accordance with an embodiment of the invention to manage identity-based decryption of digital content. In this embodiment, a message sender ("Alice") 502 uses a client node 610 to access a server node 614 operated by a message decryption service provider ("Carmen") 512. Alice 502 then downloads an identity-based encryption applet 612 from Carmen's 512 server node 614, and initiates it within a web browser executing in her client node 610. Alice then populates the identity-based encryption applet 612 with message content and authentication information associated with a message recipient ("Bob") 508.

The identity-based decryption applet 610 executing in Alice's 502 web browser then generates a random key (Krand) 632, which it then uses to process the message content to generate encrypted message content 742. The identity-based encryption applet 612 then processes Carmen's public key 624, the Krand 632, and Bob's authentication information to generate a wrapped key ciphertext Message text 734 containing the encrypted message content 742, the wrapped key ciphertext, instructions for Bob, and associated message formatting, is then generated by the identity-based encryption applet 612.

The message text 731 is then sent to Carmen's 512 server node 614 in an email message over an unsecured channel. Carmen's 512 server node 614 then retains the message text 734 for future processing instructions. Alice 502 then sends Bob 508 a message 736 to inform him that an encrypted message text is available for retrieval from Carmen's 512 server node 611. In one embodiment, the message 736 comprises authentication information (e.g., a password) to decrypt and retrieve the message content. In one embodiment, the contents of the message 736 are provided by Alice 502 to Bob 508 in a verbal communication. In another embodiment, the contents of the message 736 are provided by Alice 502 to Bob 508 in a separate email or text message (e.g., a short message service over a mobile device).

Once Bob 508 receives the message 736, he provides authentication information 738 to Carmen's 512 server 614. In one embodiment, the authentication information comprises one or more authentication factors familiar to those of skill in the art. As an example, Bob 508 may provide a user ID and password, a biometric identifier, or a cryptographic token. Skilled practitioners of the art will recognize that many such embodiments are possible and the foregoing is not intended to limit the spirit, scope or intent of the invention.

Carmen's 512 server node 614 then uses Carmen's private key 626 to process the message text 734 to decrypt the Krand 632 and Bob's authentication information. If the authentication information provided by Bob 508 matches the decrypted authentication information, then Carmen's 512 server node 614 uses the Krand 632 to decrypt the encrypted message content 742, which is then sent as decrypted message content 744 to Bob 508 over a secure channel. It will be appreciated that the process Carmen 512 uses to securely deliver the decrypted message content 744 to Bob 508 should be similar in strength of security to that of the process used by a trusted authority in an identity-based encryption scheme. The decrypted message content 744 is then displayed within a web browser 730 running on Bob's 508 client node 628.

It will be appreciated by those of skill in the art that Carmen 512 will typically incur some cost for the service that she provides Alice 502 and Bob 508 and in most cases. Carmen 512 would anticipate receiving payment. In one embodiment, Bob 508 pays for each decryption. In another embodiment, Alice 502 attaches some kind of receipt of payment, such as a blind signature. In yet another embodiment, Carmen 512 collects revenue from advertising attached to the service.

Figure 8:
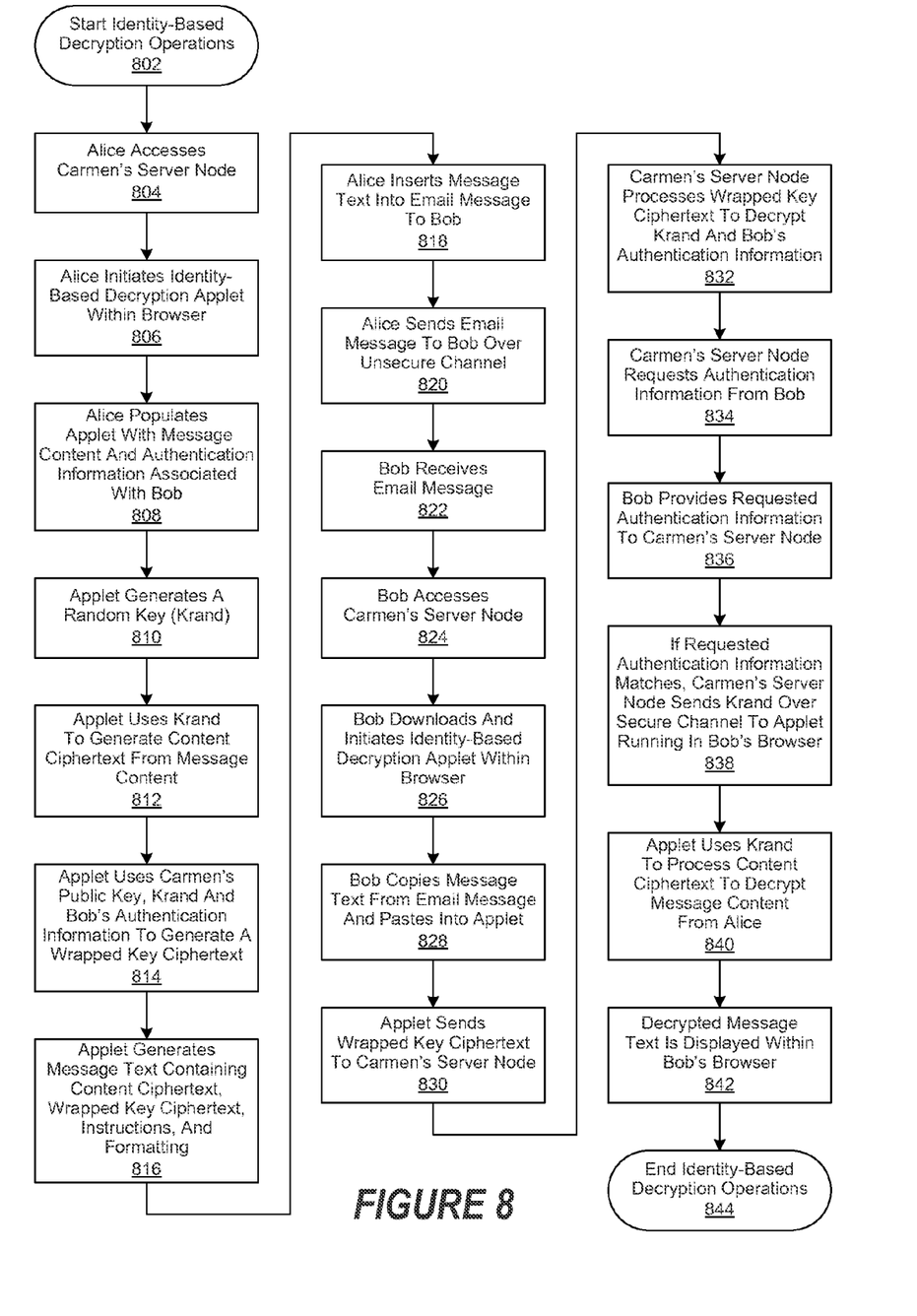
FIG. 8 is a generalized flowchart of operations performed for managing identity-based decryption of digital content.

FIG. 8 is a generalized flowchart of operations performed in accordance with an embodiment of the invention to manage identity-based decryption of digital content. In this embodiment, identity-based decryption operations are begun in step 802, followed by a message sender ("Alice") using a client node in step 804 to access a server node operated by a message decryption service provider ("Carmen"). In step 806, Alice accesses Carmen's server node and then downloads and initiates an identity-based encryption applet within a web browser executing in her client node. Then, in step 808, Alice populates the identity-based encryption applet with message content and authentication information associated with a message recipient ("Bob").

The identity-based encryption applet executing in Alice's web browser then generates a random key (Krand) in step 810, which it then uses in step 812 to process the message content (M) to generate encrypted message content (content_ciphertext), where content_ciphertext=e(Krand)(M). In step 814, the identity-based encryption applet then processes Carmen's public key (Kcarmen_public), the Krand, and Bob's authentication information (Bob_info) to generate a wrapped key ciphertext, where wrapped_key_ciphertext=e(Kcarmen_public)(Krand,Bob_info). Message text (Text) containing the content_ciphertext, the wrapped_key_ciphertext, instructions for Bob (Bob_instructions), and formatting (formatting) is then generated in step 816 by the identity-based decryption applet, where Text={content_ciphertext, wrapped_key_ciphertext,Bob_instructions,formatting}.

Alice then inserts the generated message text into an email message in step 818, which is then sent to Bob over an unsecured channel in step 820. Bob receives the email message in step 822, and in turn, accesses Carmen's server in step 824. In step 826, Bob downloads and initiates an identity-based decryption applet within a web browser executing in his client node. Bob then copies the message text from the email into the applet in step 828. In turn, the identity-based decryption applet sends the wrapped key ciphertext to Carmen's server node 830. In step 832, Carmen's server node uses Carmen's private key (Kcarment_private) to process the wrapped key ciphertext to decrypt the Krand and Bob's authentication information, where [Krand,Bob_info]=d(Kcarmen_private)(wrapped_key_ciphertext).

Carmen's server node then requests authentication information from Bob in step 834, which Bob provides in step 836. If the authentication information provided by Bob matches the decrypted authentication information, then Carmen's server node sends the decrypted Krand over a secure channel in step 838 to the identity-based decryption applet running in Bob's web browser. The Krand is then used by the identity-based decryption applet in step 840 to process the content ciphertext to decrypt the message content (M) from Alice, where M=d(Krand)(content_ciphertext). The decrypted message content is then displayed within Bob's web browser in step 842 and identity-based decryption operations are ended in step 844.

Although the described exemplary embodiments disclosed herein are described with reference to managing identity-based decryption of digital content, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A client node, comprising:
   identity-based encryption processing circuitry configured to:
   receive input from a message sender, the input including:
   message content data for a message to be sent to a message recipient at a second client node; and
   first authentication data associated with the message recipient at the second client node, said first authentication data comprising a password;
   generate a random key;
   use said random key to process the message content data to generate encrypted message content data; and
   use a public key associated with a server node to process said random key and the first authentication data associated with the message recipient at the second client node to generate a wrapped key ciphertext;
   process said encrypted message content data and said wrapped key ciphertext to generate a message text;
   provide the password to the message recipient at the second client node; and
   transmit said message text to said second client node for decryption, wherein the encrypted message is transmitted to the message recipient in a transaction separate from provision of the password; and
   wherein said message recipient at the second client node obtains permitted access to said random key from the server node for decryption of said encrypted message content data based on provision of the password matching said first authentication data after decryption of the wrapped key ciphertext at the server node.

2. The client node of claim 1, wherein:
   said second client node receives said message text and processes said message text to provide said wrapped key ciphertext and the password to said server node;
   said server node uses a private key corresponding to said public key to process said wrapped key ciphertext to decrypt said random key and said first authentication data; and said random key is provided to said second client node when said decrypted first authentication data matches the password.

3. The client node of claim 2, wherein said second client node uses said decrypted random key to decrypt said encrypted message content data.

4. The client node of claim 2, wherein said decrypted random key is provided by said server node to said second client node over a secure channel.

5. The client node of claim 1, wherein the message sender separately provides the first authentication data to the message recipient at the second client node in one of a set of:
   a verbal communication;
   an email message; and
   a short message service (SMS) message.

6. The client node of claim 1, wherein the message text includes content ciphertext corresponding to the encrypted message content, the wrapped key ciphertext, instructions for the message recipient, and formatting information.

7. A method for managing identity-based decryption, at a client node comprising identity-based encryption processing circuitry the method comprising:
   receiving input from a message sender, the input including:
      message content data for a message to be sent to a message recipient at a second client node; and
      first authentication data associated with the message recipient at the second client node, said first authentication data comprising a password;
      generate a random key;
      use said random key to process the message content data to generate encrypted message content data; and
   using a public key associated with a server node to process said random key and the first authentication data associated with the message recipient at the second client node to generate a wrapped key ciphertext;
   processing said encrypted message content data and said wrapped key ciphertext to generate a message text;
   providing a password to the message recipient at the second client node; and
   transmitting said message text to said second client node for decryption, wherein the encrypted message is transmitted to the message recipient in a transaction separate from provision of the password; and
   wherein said message recipient at the second client node obtains permitted access to said random key from the server node for decryption of the encrypted message content based on provision of the password matching said first authentication data after decryption of the wrapped key ciphertext at the server node.

8. The method of claim 7, wherein:
   said second client node receives said message text and processes said message text to provide said wrapped key ciphertext and the password to said server node;
   said server node uses a private key corresponding to said public key to process said wrapped key ciphertext to decrypt said random key and said first authentication data; and
   said random key is provided to said second client node when said decrypted first authentication data matches the password.

9. The method of claim 8, wherein said second client node uses said decrypted random key to decrypt said encrypted message content data.

10. The method of claim 8, wherein said decrypted random key is provided by said server node to said second client node over a secure channel.

11. The method of claim 7, wherein the message sender provides the first authentication data to said message recipient at said second client node in one of a set of:
   a verbal communication;
   an email message; and
   a short message service (SMS) message.

12. A server node, comprising:
   processing logic circuitry configured to:
      provide a public key associated with said server node to a message sender at a first client node, said public key used by said first client node to generate a wrapped key ciphertext comprising:
         a random key generated by said first client node to encrypt message content data: and
         a first authentication data associated with a message recipient at a second client node, said first authentication data comprising a password;
      wherein the password is provided by the message sender to the message recipient;
      wherein the encrypted message content data and the wrapped key ciphertext are transmitted in a message text by the first client node to the second client node in a transaction separate from provision of the password;
      receive said wrapped key ciphertext and the password from said second client node;
      use a private key corresponding to said public key to process said wrapped key ciphertext to decrypt said random key and said first authentication data; and
      provide said random key to said second client node if said decrypted first authentication data matches the password, and
      wherein said message recipient at the second client node obtains permitted access to said random key from the server node based on provision of the password matching said decrypted first authentication data, said second client node decrypting the encrypted message content data using the random key, said message text being generated by said first client node based on the encrypted message content data and the wrapped key ciphertext.

13. The server node of claim 12, wherein said first client node:
   uses said random key to process message content data to generate said encrypted message content data; and
   uses said public key to process said random key and said first authentication data to generate said wrapped key ciphertext.

14. The server node of claim 13, wherein said first client node:
   processes said encrypted message content data and said wrapped key ciphertext to generate said message text; and
   provides said message text to said second client node for decryption.

15. A method for managing identity-based decryption, comprising:
   using a server node comprising processing circuitry to:
      provide a public key associated with said server node to a first client node, said public key used by said first client node to generate a wrapped key ciphertext comprising:
         a random key generated by the first client node to encrypt message content data for a message sender; and a first authentication data associated with a message recipient at a second client node, said first authentication data comprising a password;

wherein the password is provided by the message sender to the message recipient;

wherein the encrypted message content data and the wrapped key ciphertext are transmitted in a message text by the first client node to the second client node in a transaction separate from provision of the password;

receive said wrapped key ciphertext and the password from said second client node;

use a private key corresponding to said public key to process said wrapped key ciphertext to decrypt said random key and said first authentication data; and provide said random key from said server node to said second client node if said decrypted first authentication data matches the password; and wherein said message recipient at the second client node obtains permitted access to said random key based on provision of the password matching said decrypted first authentication data, said second client node decrypting the encrypted message content data using the random key, said message text being generated by said first client node based on encrypted message content data and the wrapped key ciphertext.

16. The method of claim 15, wherein said first client node:
uses said random key to process message content data to generate said encrypted message content data; and
uses said public key to process said random key and said first authentication data to generate said wrapped key ciphertext.

17. The method of claim 16, wherein said first client node:
processes said encrypted message content data and said wrapped key ciphertext to generate said message text; and
provides said message text to said second client node for decryption.

18. A client node, comprising:
identity-based decryption processing circuitry configured to:
receive a message text from a message sender at a second client node, said message text comprising a wrapped key ciphertext and encrypted message content data;
receive a first authentication data from the message sender at the second client node in a separate transaction, the first authentication data comprising a password;
provide said wrapped key ciphertext and the password to a server node for processing, said wrapped key ciphertext comprising:
a random key generated by said second client node; and
the first authentication data associated with said message recipient at the client node encrypted with a public key associated with said server node for decrypting the wrapped key ciphertext; and
receive said random key in decrypted form from said server node if said first authentication data from the decrypted wrapped key ciphertext matches the password, and
wherein said message recipient at the client node obtains permitted access to said random key for decryption of said encrypted message content data based on provision of said password matching said first authentication data.

19. The client node of claim 18, wherein said second client node uses a public key corresponding to said server node to generate said wrapped key ciphertext.

20. The client node of claim 19, wherein said decrypted random key is provided by said server node to said client node over a secure channel.

21. The client node of claim 18, wherein said client node uses said decrypted random key to decrypt said encrypted message content data.

22. The client node of claim 18, wherein the message sender at said second client node provides the password to said message recipient at said client node in one of a set of:
a verbal communication;
an email message; and
a short message service (SMS) message.

23. A method for managing identity-based decryption, comprising:
using a client node including identity-based decryption processing circuitry to:
receive a message text from a message sender at a second client node, said message text comprising a wrapped key ciphertext and encrypted message content data;
receive a first authentication data from the message sender at the second client node in a separate transaction, the first authentication data comprising a password;
provide said wrapped key ciphertext and the password associated with a user of said client node to a server node for processing, said wrapped key ciphertext comprising
a random key generated by said second client node; and
a second authentication data associated with said client node encrypted with a public key associated with said server node; and
receive said random key in decrypted form from said server node if the password matches said second authentication data, and
wherein the message recipient at said client node obtains permitted access to said random key for decryption of said encrypted message content data based on provision of the second authentication data matching the password.

24. The method of claim 23, wherein said second client node uses a public key corresponding to said server node to generate said wrapped key ciphertext.

25. The method of claim 24, wherein said decrypted random key is provided by said server node to said client node over a secure channel.

26. The method of claim 23, wherein said client node uses said decrypted random key to decrypt said encrypted message content data.

27. The method of claim 23, wherein the message sender at said second client node provides the first authentication data to said message recipient at said client node in one of a set of:
a verbal communication;
an email message; and
a short message service (SMS) message.

28. A computer program product comprising a non-transitory computer readable medium comprising computer executable instructions for a client node, said computer executable instructions comprising instructions for:
receiving from a message sender at a second client node:
message content data for a message to be sent to a message recipient at a second client node; and first authentication data associated with the message recipient at the second client node, said first authentication data comprising a password provided to said message recipient at said second client node;

generating a random key;

using said random key to process the message content data to generate encrypted message content data; and using a public key associated with a server node to process said random key and the first authentication data associated with the message recipient at the second client node to generate a wrapped key ciphertext;

wherein said processing circuitry is further configured to:

process said encrypted message content data and said wrapped key ciphertext to generate a message text; and provide said message text to said second client node for decryption, wherein the message text is transmitted in a separate transaction from the password; and wherein said message recipient at the second client node obtains permitted access to said random key from the server node for decryption of said encrypted message content data based on provision of the password matching said first authentication data.

29. The computer program product of claim 28, wherein:

said second client node receives said message text and processes said message text to provide said wrapped key ciphertext and the password associated with a user of said second client node to said server node;

said server node uses a private key corresponding to said public key to process said wrapped key ciphertext to decrypt said random key and said first authentication data; and said random key is provided to said second client node when said first authentication data matches said password.

30. The computer program product of claim 29 wherein said second client node uses said decrypted random key to decrypt said encrypted message content data.

31. The computer program product of claim 29, wherein said decrypted random key is provided by said server node to said second client node over a secure channel.

32. The computer program product of claim 28, wherein the sender separately provides the first authentication data to said message recipient at said second client node in one of a set of:

a verbal communication;

an email message; and a short message service (SMS) message.

* * * * *